United States Patent
Hu et al.

(10) Patent No.: US 11,892,249 B2
(45) Date of Patent: Feb. 6, 2024

(54) HEAT DISSIPATION TABLE MADE OF ALLOY MATERIAL AND WITH SPECIAL WATERWAY DESIGN

(71) Applicant: Shanghai Worldiray Semiconductor Technology Co., Ltd., Shanghai (CN)

(72) Inventors: Changqing Hu, Shanghai (CN); Jianhai Zhao, Shanghai (CN)

(73) Assignee: Shanghai Worldiray Semiconductor Technology Co., Ltd., Shanghai (CN)

( * ) Notice: Subject to any disclaimer, the term of this patent is extended or adjusted under 35 U.S.C. 154(b) by 0 days.

(21) Appl. No.: 17/843,847

(22) Filed: Jun. 17, 2022

(65) Prior Publication Data

US 2023/0020144 A1    Jan. 19, 2023

(30) Foreign Application Priority Data

Jul. 14, 2021    (CN) .......................... 202110794764.2

(51) Int. Cl.
*F28F 21/08*    (2006.01)
*C22C 9/02*    (2006.01)

(52) U.S. Cl.
CPC .............. *F28F 21/085* (2013.01); *C22C 9/02* (2013.01)

(58) Field of Classification Search
CPC .......... F28F 21/085; F28F 21/08; C22C 9/02; Y02B 30/00; H01L 21/67103;
(Continued)

(56) References Cited

U.S. PATENT DOCUMENTS

2010/0116788 A1* 5/2010 Singh ................ H01L 21/67248
427/523
2013/0050954 A1* 2/2013 Albrecht, III ...... H05K 7/20454
361/720
(Continued)

FOREIGN PATENT DOCUMENTS

CN       105603376 A    5/2016
CN       108385086 A    8/2018
(Continued)

OTHER PUBLICATIONS

First official action and search report in priority application CN202110794764.2, dated Nov. 3, 2021.
(Continued)

*Primary Examiner* — Harry E Arant
(74) *Attorney, Agent, or Firm* — Zhu Lehnhoff LLP

(57) ABSTRACT

The present invention discloses a heat dissipation table made of an alloy material and with a special waterway design, comprising a sample placing table, a graphene heating structure abutted against the sample placing table, a heat dissipation structure abutted against the graphene heating structure and a protective cover for wrapping the heat dissipation structure. The heat dissipation structure comprises a heat dissipation table abutted against the graphene heating structure and a heat dissipation pipeline communicated with the heat dissipation table; a water pipe through groove is formed in the middle part of the heat dissipation table; and the heat dissipation pipeline is embedded into the water pipe through groove. A plurality of waterway annular grooves are formed in the heat dissipation table and communicated with the water pipe through groove. According to the present invention, the demand of diamonds on heat dissipation with high power can be met, and the cost is low.

6 Claims, 3 Drawing Sheets

(58) Field of Classification Search
CPC ........... H01L 21/67109; H01L 21/6831; H01L 21/67248; H01L 21/68785
See application file for complete search history.

(56) References Cited

U.S. PATENT DOCUMENTS

| | | |
|---|---|---|
| 2015/0315707 A1 | 11/2015 | Xue et al. |
| 2019/0218663 A1* | 7/2019 | Funakubo ......... C23C 16/45525 |
| 2020/0173014 A1 | 6/2020 | Koeck et al. |

FOREIGN PATENT DOCUMENTS

| | | | |
|---|---|---|---|
| CN | 207904363 U | 9/2018 | |
| CN | 108990187 A | 12/2018 | |
| CN | 109402610 A | 3/2019 | |
| CN | 212476879 U | 2/2021 | |
| JP | H05190464 A | 7/1993 | |
| JP | 2021019193 A * | 2/2021 | ............... B23Q 3/15 |
| WO | 2015071484 A1 | 5/2015 | |
| WO | WO-2022086638 A1 * | 4/2022 | |

OTHER PUBLICATIONS

Notification of Grant of Invention Patent in priority application CN202110794764.2 , dated Nov. 17, 2021.
First official based on Japanese counterpart patent application No. 2022-066644, dated May 17, 2022.

* cited by examiner

| | Pb | Fe | Sn | Zn | P | Cu+Sn+P | Proportion | Expansion coefficient | Heat conductivity coefficient W/mK | Electric conductivity %IACS |
|---|---|---|---|---|---|---|---|---|---|---|
| C5111 | ≤0.05 | ≤0.1 | 3.5-4.5 | ≤0.2 | 0.03-0.35 | ≥99.5 | 8.86 | 18 | 84 | 20 |
| C5101 | ≤0.05 | ≤0.1 | 4.5-5.5 | ≤0.2 | 0.03-0.35 | ≥99.5 | 8.85 | 18 | 71 | 16 |
| C5191 | ≤0.05 | ≤0.1 | 5.5-7 | ≤0.2 | 0.03-0.35 | ≥99.5 | 8.83 | 18 | 67 | 14 |
| C5212 | ≤0.05 | ≤0.1 | 7-9 | ≤0.2 | 0.03-0.35 | ≥99.5 | 8.8 | 18 | 63 | 13 |
| C5210 | ≤0.05 | ≤0.1 | 7-9 | ≤0.2 | 0.03-0.35 | ≥99.5 | 8.8 | 18 | 63 | 13 |

FIG. 3

HEAT DISSIPATION TABLE MADE OF ALLOY MATERIAL AND WITH SPECIAL WATERWAY DESIGN

The present application claims the priority of Chinese Patent Application No. 202110794764.2, filed on Jul. 14, 2021, the entire disclosure of which is hereby incorporated by reference.

TECHNICAL FIELD

The present invention relates to the technical field of diamonds, in particular to a heat dissipation table made of an alloy material and with a special waterway design.

BACKGROUND

A diamond film has become a kind of novel functional materials in the 21st century due to excellent properties. Since the early 1980s, the diamond film has gained extensive attention by countries all over the world as very approaching diamonds found in the nature due to a series of excellent properties of maximum hardness, high elasticity modulus, very low friction coefficient, very high heat conductivity, high room temperature resistivity and very good insulating property, further having very high electron and hole transfer rates, being transparent in a relatively wide optical band range and having a relatively high band gap; and therefore, the diamond film has become a new generation of functional semiconductor materials. Meanwhile, the diamond film is a good corrosion resistant material as further having very good acid-base resistance and corrosion resistance. The diamond film, as an electrode material, is different from an ordinary metal electrode, and the properties of the diamond film is greatly superior to traditional glassy carbon, pyrolytic graphite and electrodes in other forms due to a covalent structure, a very wide band gap, a dopant and the like on the surface. A diamond film electrode has a very wide potential window, a very small background current and very high chemical and electrochemical stability, is not adsorbed with organic matters and biological compounds and has an electrochemical response keeping stable and resisting corrosion within a very long time; so that the diamond film electrode may be used for electrochemical treatment on toxic organic compounds as well as high-sensitivity detection and analysis on harmful compounds. Particularly, a microelectrode may be used for measuring and monitoring nucleic acid and trace components in biological cell tissues. An effective barrier between a diamond and a water medium reaches up to 3V (1V for activation carbon), and the diamond may be used for manufacturing a capacitor with a high capacitance ratio. In addition, due to the stability of a micro diamond electrode, there are only small variations on a capacitive leakage current and an ohmic resistance. Therefore, the rapid dynamic process may be researched by voltage measurement over a time scale of microseconds. The film material, integrating various excellent properties of mechanical properties, electrical properties, thermal properties, acoustic performance, optical properties, corrosion resistance and the like, demonstrates strong energy in the global application field in future. In the existing growing process of the diamonds, a heat dissipation table cannot meet the requirements under the high-power working condition and is poor in effect.

SUMMARY OF THE INVENTION

Aiming to the deficiencies in the prior art, an objective of the present invention is to provide a heat dissipation table made of an alloy material and with a special waterway design, which can meet the demand of diamonds on heat dissipation with high power and is low in cost. In order to achieve the above objective and other advantages of the present invention, the present invention provides a heat dissipation table made of an alloy material and with a special waterway design, comprising:

a sample placing table, a graphene heating structure abutted against the sample placing table, a heat dissipation structure abutted against the graphene heating structure and a protective cover for wrapping the heat dissipation structure.

The heat dissipation structure comprises a heat dissipation table abutted against the graphene heating structure and a heat dissipation pipeline communicated with the heat dissipation table; a water pipe through groove is formed in the middle part of the heat dissipation table; and the heat dissipation pipeline is embedded into the water pipe through groove.

A plurality of waterway annular grooves are formed in the heat dissipation table and communicated with the water pipe through groove.

Preferably, the graphene heating structure comprises a first graphene piece, a second graphene piece attached to the first graphene piece and a thin heating wire disposed between the first graphene piece and the second graphene piece.

Preferably, a circle of fixed groove is formed in the periphery of the heat dissipation table, and the protective cover is embedded into the fixed groove.

Preferably, a plurality of waterway annular grooves are disposed adjacent to each other and are annularly arranged along the end surface of the heat dissipation table.

Preferably, first through holes are formed in the middle parts of the first graphene piece and the second graphene piece respectively and disposed corresponding to each other.

Preferably, a second through hole is formed in the middle part of the heat dissipation table and corresponds to the first through holes to form a channel.

Preferably, the heat dissipation table is made of a copper-tin alloy material, and the sample placing table is made of MT alloy.

Compared with the prior art, the present invention has the beneficial effects: with the graphene heating structure and the heat dissipation structure, operations of heating and heat dissipation may be conducted on the sample placing table at the same time, a wider temperature control interval may be achieved, and heat demands on heating and heat dissipation can be met at the same time; moreover, by forming the plurality of waterway annular grooves in the heat dissipation table, bubbles produced by welding of a heat dissipation water pipe and the heat dissipation table and the welding problem are avoided; and therefore, the heat dissipation quantity and the internal surface area of waterway are easily unified, and the nonuniformity of heat dissipation is weakened.

BRIEF DESCRIPTION OF THE DRAWINGS

FIG. 3 shows data for alloy proportion of heat dissipation table.

DETAILED DESCRIPTION OF THE PREFERRED EMBODIMENTS

The technical solutions in the embodiments of the present invention are described clearly and completely in the following with reference to accompanying drawings in the embodiments of the present invention. Apparently, the described embodiments are only part rather than all of the embodiments of the present invention. Based on the embodiments of the present invention, all the other embodiments obtained by those of ordinary skill in the art without inventive effort are within the scope of the present invention.

Figure 1:
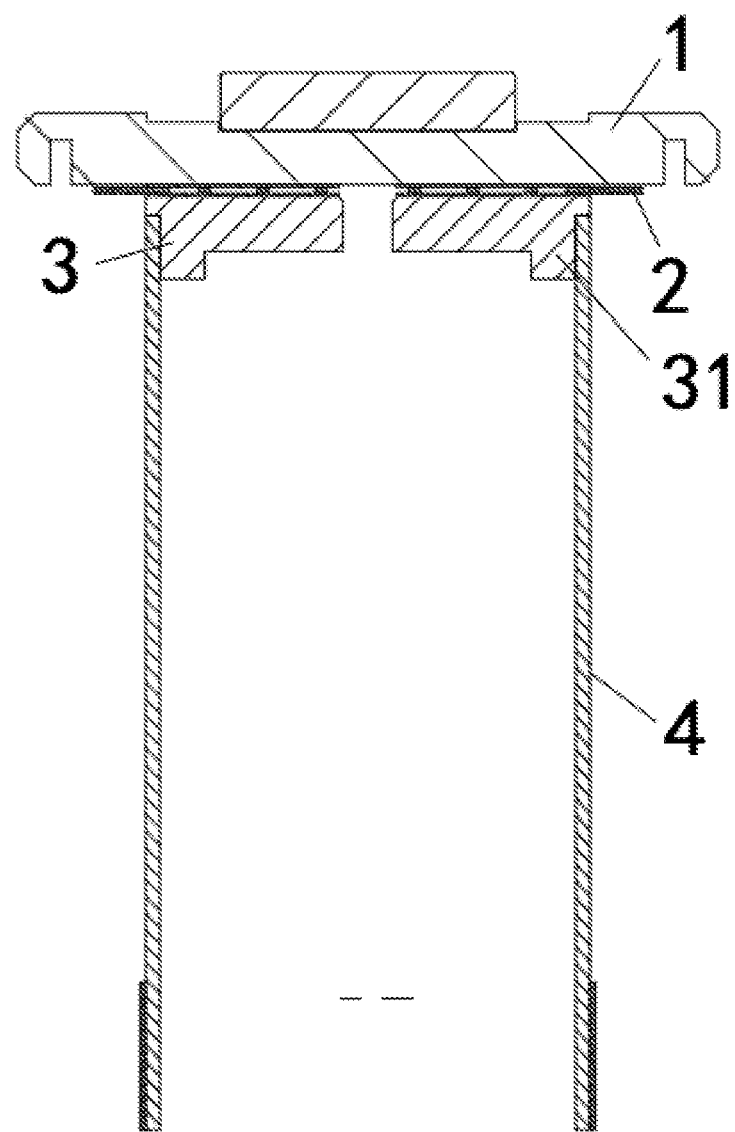
FIG. 1 is a structural schematic diagram of a heat dissipation table made of an alloy material and with a special waterway design according to the present invention.
Figure 2:
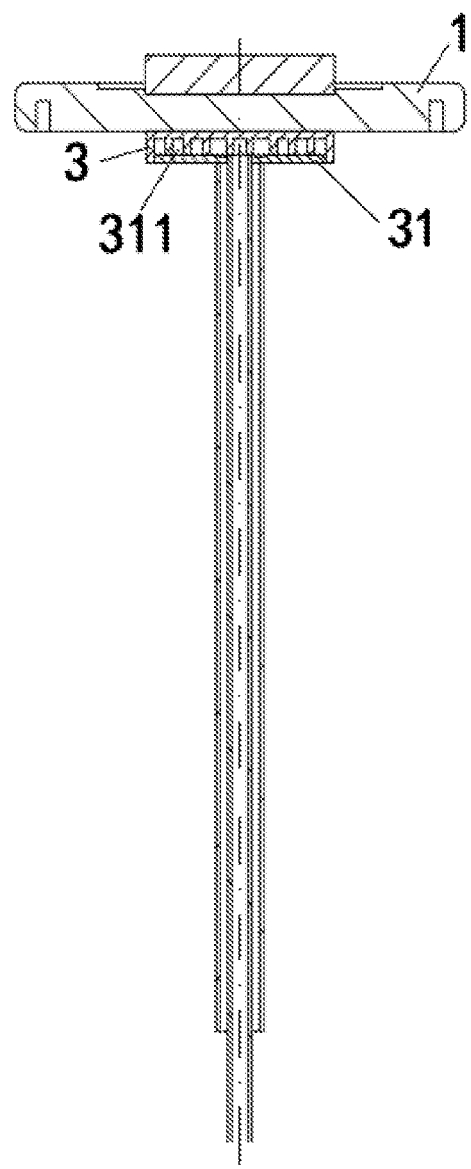
FIG. 2 is a semi-sectional structural schematic diagram of a heat dissipation table of a heat dissipation table made of an alloy material and with a special waterway design according to the present invention.

Referring to FIGS. 1-2, a heat dissipation table made of an alloy material and with a special waterway design comprises a sample placing table 1, a graphene heating structure 2 abutted against the sample placing table 1, a heat dissipation structure 3 abutted against the graphene heating structure 2 and a protective cover 4 for wrapping the heat dissipation structure 3. The heat dissipation structure 3 comprises a heat dissipation table 31 abutted against the graphene heating structure 2 and a heat dissipation pipeline communicated with the heat dissipation table 31; a water pipe through groove is formed in the middle part of the heat dissipation table 31; and the heat dissipation pipeline is embedded into the water pipe through groove. A plurality of waterway annular grooves 311 are formed in the heat dissipation table 31 and communicated with the water pipe through groove; where by forming the waterway annular grooves 311 in the heat dissipation table 31, nonuniform heat dissipation due to bubbles produced by welding of a heat dissipation water pipe and the heat dissipation table 31 is avoided, and the heat dissipation quantity and the internal surface area of waterway are very easily unified to ensure a variable difference between every two individuals. The graphene heating structure 2 comprises a first graphene piece, a second graphene piece attached to the first graphene piece and a thin heating wire disposed between the first graphene piece and the second graphene piece. After a sample is placed on the sample placing table 1, functions of heating and heat dissipation may be conducted at the same time with the graphene heating structure 2 and the heat dissipation structure 3, so that the sample on the sample placing table 1 is stably kept in a required temperature. Moreover, when a work starts, the heat dissipation structure 3 stops heat dissipation; the heat dissipation table is preheated to a working temperature through the graphene heating structure 2; then a working power of the graphene heating structure 2 reaches a certain value, and at this time, the graphene heating structure 2 and the heat dissipation structure 3 work at the same time to enable a temperature of the heat dissipation table to reach the required temperature; and therefore, a temperature control interval of the working table may be adjusted to be wider.

Further, the graphene heating structure 2 comprises the first graphene piece, the second graphene piece attached to the first graphene piece and the thin heating wire disposed between the first graphene piece and the second graphene piece.

Further, a circle of fixed groove is formed in the periphery of the heat dissipation table 31, and the protective cover 4 is embedded into the fixed groove.

Further, a plurality of waterway annular grooves 311 are disposed adjacent to each other and are annularly arranged along the end surface of the heat dissipation table 31.

Further, first through holes are formed in the middle parts of the first graphene piece and the second graphene piece respectively and disposed corresponding to each other.

Further, a second through hole is formed in the middle part of the heat dissipation table 31 and corresponds to the first through holes to form a channel.

Further, the heat dissipation table 31 is made of a copper-tin alloy material; and the heat dissipation efficiency is weakened by making the heat dissipation table 31 with a proportion of a copper-tin alloy, so as to meet the demand of an existing structure. As shown in FIG. 3, the sample placing table 1 is made of MT alloy; and by adding a small quantity of Ag in the sample placing table 1 during powder metallurgy, the electric conductivity and the heat exchange efficiency may be further improved.

Moreover, a scaled value of an oxygen-free copper structure is obtained with reference to the above proportion, and thus various demands are met. The 6 kW design requirement is met by using the oxygen-free copper structure; the electric conductivity and the heat exchange efficiency are further provided by using a copper-silver alloy; and according to our actual design structure, through actual measurement with simulation and actual thermodynamic models, a related corresponding relationship is made to obtain a corresponding proportion. A basic ratio of Cu to Ag is 2%.

Working principle: water is stopped from being injected into the heat dissipation waterway at the beginning of work. The heat dissipation table is preheated to a working temperature by using a graphene heating sheet; and the demands on heating and heat dissipation can be met at the same time by using very good heat conductivity of graphene. An original operation flow is entered, plasmas glow to a certain power value; a flow rate of the heat dissipation waterway is adjusted if needed; a temperature of a sample table is controlled at a certain temperature point; a power of a heater is decreased with increase in input power; and the temperature of the sample table is always controlled at the certain point by increasing the flow rate of the heat dissipation waterway. When the input power exceeds its critical point, the heater is turned off, and the flow rate of the heat dissipation waterway is increased; or when the working temperature of the sample table is found to be insufficient, the heater may be turned on, and the heat dissipation efficiency is weakened.

The quantity of equipment and the treatment scale described here are used for simplifying the description of the present invention; and applications, modifications and variations to the present invention are apparent to those of ordinary skill in the art.

Although the embodiments of the present invention have been disclosed above, the embodiments are not limited to the applications listed in the description and the implementation, and are completely applicable to various fields suitable for the present invention. Additional modifications can be easily implemented for those skilled in the art. Therefore, without departing from the general concept defined by the claims and the equivalent scope, the present invention is not limited to specific details and legends shown and described herein.

The invention claimed is:

1. A heat dissipation apparatus comprising:
   a sample placing table having a top surface for supporting a substrate during processing of the substrate and a bottom surface;
   a heating structure formed separately from the sample placing table and comprising a first graphene piece having a top surface contacting the bottom surface of the sample placing table and a bottom surface, a second graphene piece having a top surface opposing the bottom surface of the first graphene piece and a bottom surface, and a heating wire disposed between the first and second graphene pieces, the heating structure having a through hole extending through both graphene pieces from the top surface of the first graphene piece to the bottom surface of the second graphene piece;

a heat dissipation table formed separately from the heating structure and having a top surface contacting the bottom surface of the second graphene piece and a bottom surface, the heat dissipation table having a through hole extending from the top surface to the bottom surface of the heat dissipation table and forming a channel together with the through hole in the heating structure, and a plurality of annular waterway grooves formed inside the heat dissipation table and fluidly communicating with the through hole in the heat dissipation table;

a heat dissipation pipeline having an upper end embedded in the through hole in the heat dissipation table and a lower end extending out of the heat dissipation table; and a protective cover surrounding the heat dissipation table.

2. The heat dissipation apparatus according to claim 1, wherein a circular groove is formed in an outer periphery of the heat dissipation table, and the protective cover is embedded in the groove.

3. The heat dissipation apparatus according to claim 1, wherein the waterway grooves are disposed adjacent to each other and are annularly arranged along an end surface of the heat dissipation table.

4. The heat dissipation apparatus according to claim 1, wherein the heat dissipation table is made of a copper-tin alloy.

5. The heat dissipation apparatus according to claim 1, wherein the first and second graphene pieces are secured to each other at an outer peripheral region of the heat dissipation structure and are separated from each other by the heating wire between the through hole in the heat dissipation structure and the outer peripheral region.

6. The heat dissipation apparatus according to claim 1, wherein the heat dissipation pipeline has an inner channel extending in an axial direction of the pipeline and an outer channel surrounding the inner channel and extending in the axial direction of the pipeline.

* * * * *